United States Patent
Karlsson et al.

(10) Patent No.: US 9,584,013 B2
(45) Date of Patent: Feb. 28, 2017

(54) METHOD FOR REMOTE CONTROL OF A POWER CONVERTER MODULE AND A DEVICE THEREFOR

(75) Inventors: Magnus Karlsson, Oskarshamn (SE); Oscar Persson, Kalmar (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 175 days.

(21) Appl. No.: 14/382,089

(22) PCT Filed: Mar. 1, 2012

(86) PCT No.: PCT/SE2012/050235
§ 371 (c)(1),
(2), (4) Date: Aug. 29, 2014

(87) PCT Pub. No.: WO2013/129983
PCT Pub. Date: Sep. 6, 2013

(65) Prior Publication Data
US 2015/0028843 A1 Jan. 29, 2015

(51) Int. Cl.
*G05F 1/565* (2006.01)
*H02M 3/156* (2006.01)
*G06F 1/30* (2006.01)

(52) U.S. Cl.
CPC .......... *H02M 3/156* (2013.01); *G05F 1/565* (2013.01); *G06F 1/305* (2013.01)

(58) Field of Classification Search
CPC .... H02M 3/156; H02M 3/158; H02M 3/1588; H02M 2003/1566; H02M 3/155;
(Continued)

(56) References Cited

U.S. PATENT DOCUMENTS

| 7,372,682 B2 | 5/2008 | Chapuis |
| 2002/0122323 A1* | 9/2002 | Nagaya .................. H02M 1/32 363/56.08 |

(Continued)

FOREIGN PATENT DOCUMENTS

JP 2006101565 A 4/2006

OTHER PUBLICATIONS

International Preliminary Report on Patentability for PCT/SE2012/050235, mailed Sep. 2, 2014, 5 pages.
(Continued)

*Primary Examiner* — Jeffrey Gblende
(74) *Attorney, Agent, or Firm* — Withrow & Terranova, PLLC

(57) ABSTRACT

The present disclosure relates to methods, systems and a module for operating a power converter module, the power converter module comprises a voltage source, a remote control terminal configured to be connected to a voltage potential for remote control of the power converter module. A voltage converter is configured to send an alarm signal, determine the voltage potential of the remote control terminal, and control an output voltage of the voltage converter at an output terminal of the power converter module based on the determined voltage potential of the remote control terminal. An alarm branch is configured to change the voltage potential of the remote control terminal by a voltage source in response to an alarm signal from the voltage converter when the remote control terminal is connected to a voltage potential, thereby causing the voltage converter to control the output voltage at the output terminal.

16 Claims, 3 Drawing Sheets

(58) Field of Classification Search
CPC ....... H02M 3/1582; H02M 2003/1557; H02M 3/157; H02M 2001/0012; H02M 3/1563; H02M 2001/0009; H02M 3/10; H02M 3/125; H02M 3/13; H02M 3/135; H02M 3/145; H04B 2215/069; G05F 1/40; G05F 1/42; G05F 1/44; G05F 1/462; G05F 1/52; G05F 1/56

See application file for complete search history.

(56) References Cited

U.S. PATENT DOCUMENTS

| | | |
|---|---|---|
| 2005/0180181 A1 | 8/2005 | Gaudreau et al. |
| 2005/0190517 A1 | 9/2005 | Schweigert et al. |
| 2006/0146504 A1 | 7/2006 | Belson et al. |
| 2007/0236155 A1* | 10/2007 | Kao .................. H05B 33/0815 315/247 |
| 2008/0012542 A1* | 1/2008 | Liu .................... H02M 1/32 323/271 |
| 2010/0064124 A1* | 3/2010 | Rinne .................. H02M 3/157 713/1 |
| 2013/0321967 A1* | 12/2013 | Muneyasu ............. H02H 3/00 361/88 |
| 2014/0077775 A1* | 3/2014 | Gotou .................. G01R 31/40 323/234 |

OTHER PUBLICATIONS

International Search Report and Written Opinion for PCT/SE2012/050235, mailed Dec. 17, 2012, 7 pages.

Extended European Search Report for Application No. 12869595.4, mailed Feb. 4, 2015, 6 pages.

Notice of Opinion for Chinese Patent Application No. 201280071030.0, mailed May 19, 2016, 15 pages.

* cited by examiner

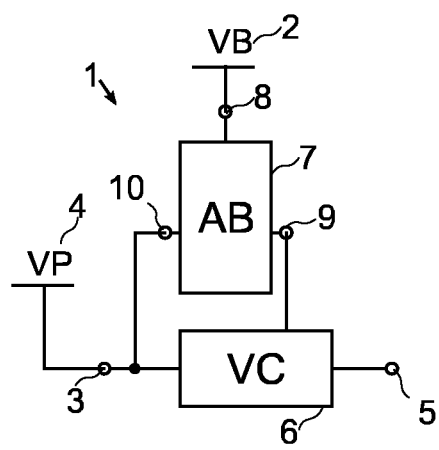
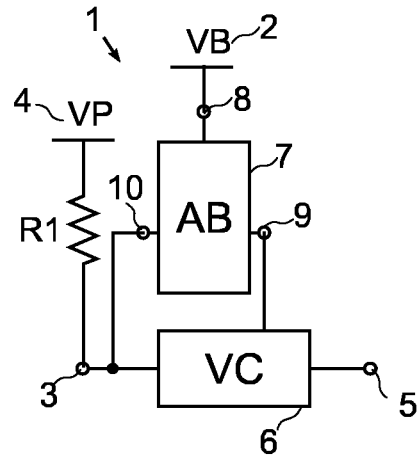
Fig. 1
Fig. 2
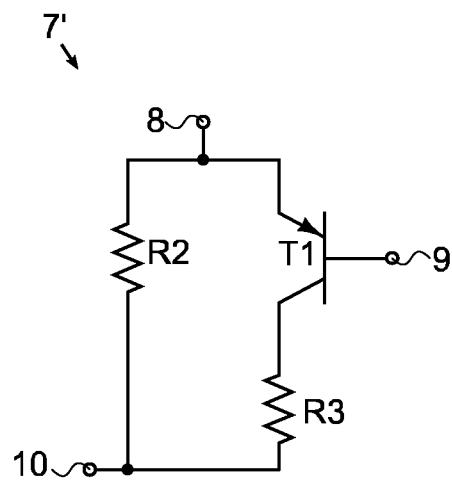
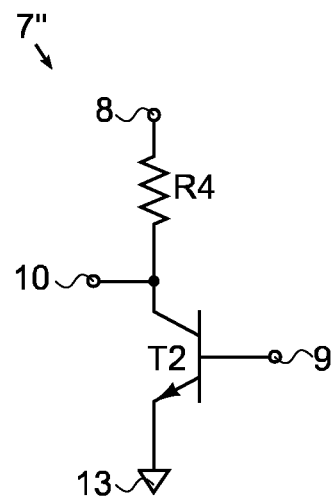
Fig. 3
Fig. 4

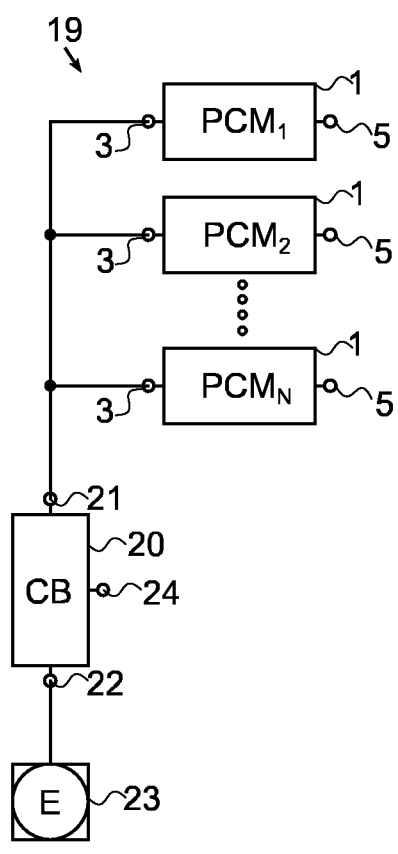
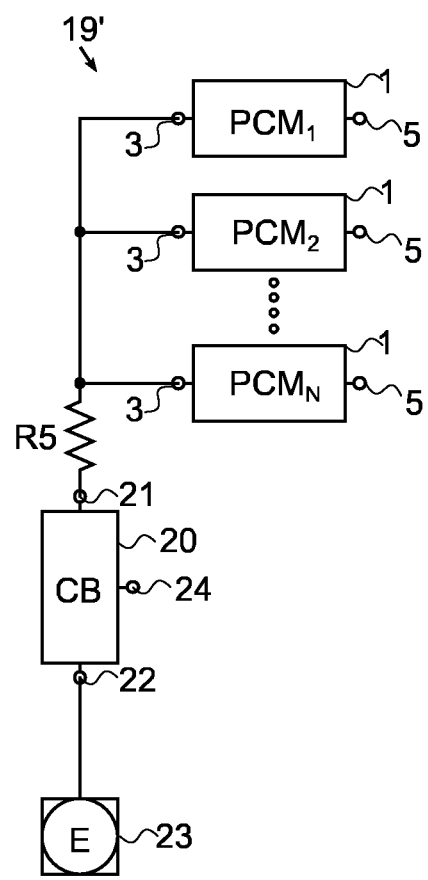
Fig. 6
Fig. 7

METHOD FOR REMOTE CONTROL OF A POWER CONVERTER MODULE AND A DEVICE THEREFOR

This application is a 35 U.S.C. §371 national phase filing of International Application No. PCT/SE2012/050235, filed Mar. 1, 2012, the disclosure of which is incorporated herein by reference in its entirety.

TECHNICAL FIELD

The embodiments described herein relate to the field of power converters for conversion of electrical power. More particularly the embodiments relates to a method for remote control of the operation of a power converter module, a power converter module and a power converter system.

BACKGROUND

In modern electronics a demand for more power at lower supply voltages constantly increases due to higher levels of integration and modern device technology.

A common solution for supplying a circuit with high currents is to connect several power converter modules in a current sharing configuration i.e. a parallel configuration. Such a current sharing configuration might cause some problems if one of the power converter modules therein all of a sudden malfunctions and is no longer operative. This loss of power from the malfunctioning power converter module causes the rest of the power converter modules in the current sharing configuration to supply a higher current. This might in turn trigger another power converter module to malfunction. If this series of events continuous uninterrupted a so called domino effect occurs. A further problem occurs if one of the previously malfunctioning power converter modules becomes operative again and is forced to supply a high current due to malfunctioning of the other power converter modules. The now operative power converter module quickly becomes overheated and malfunctions again. This domino effect might cause a power converter system configured for current sharing to completely shut down.

A number of techniques exist for allowing a power converter system to be used in a current sharing configuration without the problems associated with the domino effect. The obvious solution for eliminating the domino effect is to use synchronized start and stop of the power converter modules, respectively. The synchronized start and stop can be achieved by using a communication bus between the power converter modules for initiating synchronized start and stop thereof, such a bus can for example be a CAN bus or a dedicated digital power bus such as PMBus (Power Management Bus). The use of a dedicated communication bus for controlling a power converter system is disclosed in U.S. Pat. No. 7,372,682.

However, a dedicated communication bus might be unnecessary complicated for some applications.

SUMMARY

It is an object to provide a method and arrangements which at least partly overcome some of the above disadvantages and provide improved means for power conversion.

The above stated object is achieved by means of methods, a module and a system according to the independent claims.

A first exemplary embodiment provides a power converter module. The power converter module comprises a voltage source and a remote control terminal. The remote control terminal is configured to be connected to a voltage potential for remote control of the power converter module. The power converter module further comprises an output terminal for output of an output voltage and a voltage converter operatively connected to the output terminal and to said remote control terminal. The voltage converter is configured to send an alarm signal, determine the voltage potential of the remote control terminal, and control the output voltage of the voltage converter at the output terminal of the power converter module based on the determined voltage potential of the remote control terminal. The power converter module further comprises an alarm branch. The alarm branch comprises a bias terminal operatively connected to the voltage source, an alarm terminal operatively connected to the voltage converter for receiving said alarm signal, and a control terminal operatively connected to said remote control terminal. The alarm branch is configured to change the voltage potential of the remote control terminal by means of the voltage source in response to an alarm signal from the voltage converter when the remote control terminal is connected to a voltage potential, thereby causing the voltage converter to control the output voltage at the output terminal.

A second exemplary embodiment provides a method for operating a power converter module. The method comprises a step of detecting if an alarm condition has changed in a voltage converter of the power converter module. The method also comprises a step of sending an alarm signal from said voltage converter to an alarm branch of the power converter module, if an alarm condition is detected by said voltage converter. The method also comprises a step of controlling a voltage potential of a remote control terminal of the power converter module by means of the alarm branch. The alarm branch is controlled by the alarm signal and is arranged between a voltage source of the power converter module and the remote control terminal. The remote control terminal is operatively connected to the voltage converter and connected to a voltage potential for remote control of the power converter module. The method also comprises a step of determining the voltage potential of the remote control terminal by means of the voltage converter. The method further comprises a step of controlling the output voltage at an output terminal of the power converter module by means of the voltage converter. The controlling of the output voltage is based on the determined voltage potential of the remote control terminal.

A third exemplary embodiment provides a power converter system that comprises at least one power converter module according to the first exemplary embodiment above, and a control branch. The control branch comprises a system control terminal for remote control of the power converter system. The system control terminal is operatively connected to the remote control terminal of the at least one power converter module. The control branch further comprises a voltage terminal operatively connected to a voltage source, and an activation terminal operative for receiving an activation signal.

The control branch is configured to be controlled to open or close by the activation signal when received by the activation terminal. This opening or closing of said control branch results in a changed voltage potential of the system control terminal and thereby also in a changed voltage potential of the remote control terminal of the at least one power converter module.

An advantage of certain embodiments described herein is that synchronized start and stop of the power converter modules by means of the remote control terminal can be achieved, thus eliminating the above described domino effect.

Another advantage of certain embodiments described herein is that an alarm signal in one power converter module of a system of power converter modules can disable the output of the other power converter modules that have interconnected remote control terminals.

Yet another advantage of some embodiments described herein is compatibility with former uses of the remote control terminal, thus allowing for easy implementation in configurations with an existing remote control terminal.

A further advantage of some embodiments described herein is that it is possible to use the remote control terminal for sending instructions to the power converter module by means of said remote control terminal.

A further advantage of some embodiments described herein is that it is possible to use less restrictive safety margins for the power converter modules in a power converter system.

Yet further advantages and features of embodiments of the present invention will become apparent when reading the following detailed description in conjunction with the drawings.

BRIEF DESCRIPTION OF THE DRAWINGS

FIG. 1 is a schematic block diagram of a power converter module.

FIG. 2 is a schematic block diagram of a power converter module comprising a resistor.

FIG. 3 is a circuit schematic illustrating an embodiment of an alarm branch comprising a PNP-transistor.

FIG. 4 is a circuit schematic illustrating an embodiment of an alarm branch comprising a NPN-transistor.

FIG. 6 is a schematic block diagram illustrating an embodiment of a power converter system.

FIG. 7 is a schematic block diagram illustrating an embodiment of a power converter system comprising a resistor.

DETAILED DESCRIPTION

Figure 5:
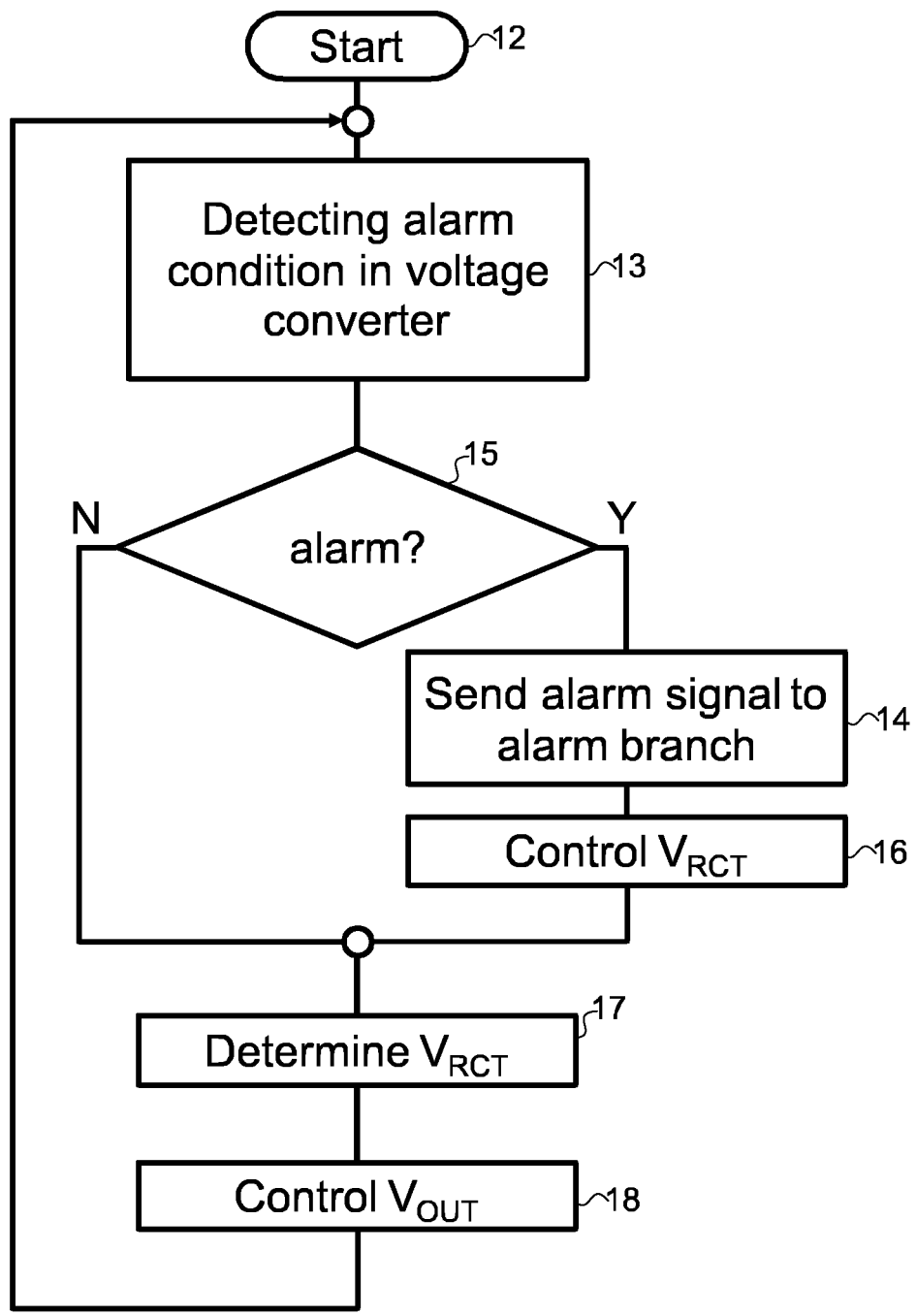
FIG. 5 is flow diagram illustrating an embodiment of a method for operating a power converter module.

The present invention will now be described more fully hereinafter with reference to the accompanying drawings, in which different exemplary embodiments are shown. These exemplary embodiments are provided so that this disclosure will be thorough and complete and not for the purpose of limitation.

In the following the meaning of positive logic should be interpreted as, the more positive potential is considered to represent "True" and the more negative potential is considered to represent "False". The meaning of negative logic should be interpreted as, the more negative potential is considered to represent "True" and the more positive potential is considered to represent "False".

The terms "voltage potential" and "potential" are used interchangeably herein.

A common solution for remote control of power converter modules is to utilize a special terminal adapted for this purpose. Such a terminal is quite commonly designated remote control terminal. By controlling the power converter module with the remote control terminal and control logic a remotely controlled operation thereof can be achieved. However, this simple remote control terminal does not solve problems in connection with configurations for current sharing and in particular the domino effect.

The control of a power converter module by means of a remote control terminal are usually based on either positive or negative logic. The activation of the power converter module by means of negative logic is performed by supplying a ground potential to the remote control terminal. This is usually performed by connecting the remote control terminal to the ground potential by means of a jumper. Hereby a low resistance path is utilized. The power converter module is deactivated by supplying a high potential such as the supply voltage to the remote control terminal by means of a low resistance path. These arrangements causes the potential of the remote control terminal to become rather stiff i.e. a low resistance path requires a significant current to create a measurable voltage drop thereover.

The activation of a power converter module by means of positive logic is performed by supplying a high potential to the remote control terminal. The corresponding deactivation is performed by supplying a low potential to the remote control terminal. Moreover, this supply of high and low potential, respectively, is normally performed by using a low resistance path to the potentials.

The herein described embodiments are based on the common idea that it is possible to realize a remote control function of the power converter module by means of using a resistor as a current path for supplying the remote control terminal with a potential. If said resistor is sufficiently large the potential of the remote control can easily be changed by additional circuits. Hence, the remote control of the power converter module can easily be achieved.

FIG. 1 is a schematic block diagram of an exemplary power converter module (PCM) commonly designated 1, this PCM 1 can for example be an intermediate bus converter in a digital power system. The PCM 1 comprises a voltage source (VB) 2 for providing the PCM 1 with an internal reference potential. The PCM 1 is configured for remote control of the operation thereof. For this purpose the PCM 1 further comprises a remote control terminal (RCT) 3 configured to be connected to a voltage potential (VP) 4. In order to supply a load with power, the PCM 1 further comprises an output terminal 5 for output of an output voltage. The RCT 3 is operatively connected to a voltage converter (VC) 6, which VC 6 is further operatively connected to the output terminal 5.

The VC 6 is configured to convert an input voltage to an output voltage at the output terminal 5. The VC 6 may comprise a switched mode power converter such as a buck, a boost, a forward, a half bridge, a full bridge or a fly-back converter for that purpose. In addition to standard functions that can be found in a conventional voltage converter the VC 6 is configured to send an alarm signal. The alarm signal is indicative of an alarm condition in the VC 6. Such alarm conditions can for example be over temperature, overload, fault signals etc. The VC 6 is further configured to determine the voltage potential of the RCT 3 and to control the operation of the VC 6 based on the determined voltage potential of the RCT 3.

The PCM 1 further comprises an alarm branch (AB) 7 configured to receive said alarm signal from the VC 6. The AB 7 comprises a bias terminal 8, an alarm terminal 9 and a control terminal 10. The bias terminal 8 is operatively connected to the voltage potential VB 2 and the control terminal 10 is operatively connected to the RCT 3. The alarm terminal 9 is operatively connected to the VC 6 for receiving said alarm signal. The AB 7 is configured to change the voltage potential of the RCT 3 by means of said voltage source VB 2 in response to a receipt of an alarm signal from the VC 6 when said RCT 3 is connected to a voltage potential VP 4. This change of voltage potential of the RCT 3 is sensed by the VC 6 and the corresponding control of the output voltage at the output terminal 5 by means of the VC 6 occurs.

The PCM 1 can be configured to be controlled by aforementioned positive or negative logic. Hence, the AB 7 and the VC 6 may be configured for either positive or negative logic.

In one embodiment of the PCM 1, suitable for remote control thereof with positive logic, the VC 6 is configured to disable the output voltage at the output terminal of the PCM 1 if the voltage potential of the RCT 3 is determined to be above a first threshold value. This determination can easily be incorporated in the VC 6 as a schmitt trigger circuit. Wherein, the first threshold value in one embodiment may be the upper threshold voltage of the schmitt trigger circuit. In one exemplary embodiment may the upper threshold value be 70% of the maximum potential of the remote control terminal. Accordingly, the AB 7 is configured to cause a potential of the RCT 3 above the first threshold value upon receipt of the alarm signal.

In one embodiment of the PCM 1, suitable for remote control thereof with positive logic. The VC 6 is configured to enable the output voltage at the output terminal of the PCM 1 if the voltage potential of the RCT 3 is determined to be below a second threshold value. Wherein, the second threshold value in one embodiment may be the lower threshold voltage of the schmitt trigger circuit. In one exemplary embodiment may the lower threshold value be 20% of the maximum potential of the remote control terminal. The AB 7 is configured to cause a voltage potential of the RCT 3 below the second threshold value if no alarm signal has been received or if a previously received alarm signal no longer is received.

The above mentioned embodiments of the PCM 1 suitable for remote control thereof with positive logic may be combined. In some embodiments the first and second threshold values are identical.

In yet another embodiment of the PCM 1, suitable for remote control thereof with negative logic. The VC 6 is configured to disable the output voltage at the output terminal of the PCM 1 if the voltage potential of the RCT 3 is determined to be below a third threshold value. Wherein, the third threshold value in one embodiment may be the lower threshold voltage of the schmitt trigger circuit. In one exemplary embodiment may the lower threshold value be 20% of the maximum potential of the remote control terminal. Accordingly, the AB 7 is configured to cause said potential of the RCT 3 below the third threshold value upon receipt of the alarm signal.

In yet another embodiment of the PCM 1, suitable for remote control thereof with negative logic. The VC 6 is configured to enable the output voltage at the output terminal of the PCM 1 if the voltage potential of the RCT 3 is determined to be above a fourth threshold value. Wherein, the fourth threshold value in one embodiment may be the higher threshold voltage of the schmitt trigger circuit. In one exemplary embodiment may the higher threshold value be 70% of the maximum potential of the remote control terminal. The AB 7 is configured to cause a voltage potential of the RCT 3 above the fourth threshold value if the previously received alarm signal no longer is received.

The embodiment according to FIG. 1 is suitable for remote control of the PCM 1 with positive logic.

FIG. 2 is a schematic block diagram of the exemplary PCM 1, which in addition to the hereinabove described embodiment comprises a resistor R1 connecting the RCT 3 to the voltage potential VP 4.

The embodiment according to FIG. 2 is suitable for remote control of the PCM 1 with negative logic. Hence, for remote control of the PCM 1 with negative logic, the RCT 3 may be connected to a potential VP 4 by the resistor R1. This potential VP 4 can for example be a ground potential of the PCM 1. By connecting VP 4 to RCT 3 via the resistor R1 it is possible to control the voltage potential of the RCT 3 by means of the control terminal 10 of the AB 7. The potential of the RCT 3 is proportional to the current flowing through the resistor R1. This means that the AB 7 easily can be configured to output extra current through the control terminal 10 to the resistor R1 in response to a received alarm signal at the alarm terminal 9. Thereby, the voltage potential of the RCT 3 becomes controllable by means of the AB 7 in response to an alarm signal.

FIG. 3 is a circuit schematic illustrating an embodiment of an AB 7', suitable for remote control of the PCM 1 with negative logic. The AB 7' comprises a first resistor R2 that in a first end is operatively connected to the bias terminal 8 and in a second end is operatively connected to the control terminal 10. The AB 7' further comprises a second resistor R3 in which the first end thereof is operatively connected to the control terminal 10. The AB 7' also comprises a PNP-transistor, wherein an emitter thereof is operatively connected to the bias terminal 8, a base thereof is operatively connected to the alarm terminal 9, and an collector thereof is operatively connected to a second end of said second resistor R3.

The first resistor R2 provides a first current path to the control terminal 10. When the alarm signal is received at the alarm terminal 9 the PNP-transistor turns on and the emitter exhibits a potential close to the potential of the collector. Thereby, a second current path, comprising the PNP-transistor and the second resistor R3, is activated.

The exemplary embodiment of the AB 7' in FIG. 3 is suitable for use together with the PCM 1 in FIG. 2 for implementing remote control with negative logic. In such a configuration the hereinabove mentioned second current path to the control terminal 10, in connection with the receipt of the alarm signal, will cause an increaesed voltage drop over the resistor R1 of the PCM 1 and thus a changed voltage potential of the RCT 3.

FIG. 4 is a circuit schematic illustrating an embodiment of an AB 7", suitable for remote control of the PCM 1 with positive logic. The AB 7" comprising a first resistor R4 that in a first end is operatively connected to the bias terminal 8 and in a second end operatively connected to a collector of a NPN-transistor (T2), and wherein an emitter thereof is operatively connected to a low voltage potential 13 such as ground potential of the PCM 1. The control terminal 10 is operatively connected to the collector of the NPN-transistor T2, and wherein a base of the NPN-transistor T2 is operatively connected to the alarm terminal 9. Upon receipt of the alarm signal, at the alarm terminal 9, the NPN-transistor T2 turns on and the collector and emitter thereof exhibits essentially the same potential 13. Thereby, the control terminal 10 exhibits the same potential as potential 13.

The exemplary embodiment of the AB 7" in FIG. 4 is suitable for use in conjunction with the PCM 1 in FIG. 1 for implementing positive logic control. In such a configuration the hereinabove mentioned potential 13 is connected to the RCT 3 upon receipt of the alarm signal causing the VC 4 to disable the output voltage at the output terminal 5.

In another embodiment of the PCM 1 the VC 6 is configured to send at least two alarm signals simultaneously to the AB 7, wherein the at least two alarm signals comes from a group of alarm signals. This group of alarm signals may comprise the hereinabove mentioned alarm signals but may also comprise control signals for controlling the operation of the VC 6, such a control signal can for example be a signal controlling the VC 6 to enter a different mode of operation. The AB 7 is configured to convert the received at least two alarm signals to an output potential at the control terminal 10 thereof, wherein the output potential is indicative on the received at least two alarm signals. Such a potential can easily be obtained by forming an alarm number from the at least two alarm signals in the AB 7, this alarm number can then easily be converted to a unique potential by using a digital to analogue converter (DAC) in the AB 7 for controlling the potential of the control terminal 10. The VC 6 is configured to convert said output potential of the RCT 3 to corresponding control signals for controlling the VC 6. Thus, the potential of the RCT 3 needs to be converted to an alarm number and this can easily be achieved by using an analogue to digital converter (ADC).

This use of a DAC in the AB 7 and a ADC in the VC 6 enables effective transmission of both alarm signals and control signals by means of the RCT 3. But of course for more simple embodiments may the DAC/ADC functionality be achieved by using simple analogoue circuits such as current generators and comparator circuits, but this embodiment illustrates the concept of having multiple potential levels on the RCT 3 for controlling the VC 6 by means of the AB 7.

FIG. 5 is a flow diagram of an exemplary method for operating a PCM 1 according to embodiments of the invention. The method comprises:

Detecting 13 if an alarm condition have changed in the VC 6 of the PCM 1. The alarm condition indicative of internal errors of the VC 6. This alarm condition can for example comprise temperature data for the core of the inductor used in the VC 6, temperature of the output transistors, different overload conditions such as over current, under voltage etc. This detection also comprises functionality to sense if a previously received alarm signal is no longer present.

Sending 14 an alarm signal from the VC 6 to the AB 7 of the PCM 1, if an alarm condition 15 is detected by the VC 6. This sending of an alarm signal may be performed by using digital communication.

Controlling 16 the voltage potential of the RCT 3 of the PCM 1 by means of the AB 7, if the alarm condition 15 is detected by the VC 6. Thus, if an alarm condition 15 is detected by the VC 6 then the potential of the RCT 3 should be controlled by the AB 7 as a response to a change in the alarm condition. This alarm condition may indicate both presence and absence of an internal error in the VC 6.

Determining 17 the voltage potential of the RCT 3 by means of the VC 6. This determination can be performed by a comparator circuit within the VC 6, in one embodiment this comparator circuit comprises a schmitt trigger.

Controlling 18 the output voltage at an output terminal 5 of the PCM 1, by means of the VC 6, based on the determined voltage potential of the RCT 3.

This method implements a way of controlling the PCM 1 by means of the potential of the RCT 3, which allows for avoidance of domino effects in a system using multiple PCMs configured for current sharing.

In the following is an exemplary scenario of the method according to the embodiment hereinabove described. Assume a PCM 1 configured for negative logic control according to FIG. 2. During normal operation of the PCM 1, suddenly an alarm condition is triggered by an over current in the VC 6. As a direct response to the alarm condition is an alarm signal sent from the VC 6 to the AB 7. The AB 7 is configured according to FIG. 3. Upon receipt of the alarm signal at the alarm terminal 10 the PNP transistor T1 becomes active and a current flows through the resistor R3 to the control terminal 10 and to the RCT 3 and via the resistor R1 to the potential VP. This current causes an increased voltage drop over the resistor R1 and thereby a changed potential of the RCT 3. This changed potential of the RCT 3 causes the VC 6 to become non-operative.

When the over current no longer is present in the VC 6, the alarm signal is no longer indicative of an alarm condition in the VC 6. Thereby, the PNP transistor of the AB 7 becomes inactive and no current is forced through the resistor R3. This results in that the potential of the RCT 3 changes back to a potential indicative of no alarm and the PCM 1 becomes operative again.

In some embodiments of the PCM 1 discussed herein, the VC 6 may comprise an internal alarm circuit causing the output voltage of the VC 6 to be disabled in case of an alarm condition indicative of an internal error, even if the potential of the RCT 3 is unchanged.

In one embodiment of the method, wherein when the RCT 3 is operatively connected to a potential VP 4 via a resistor R1, the control 16 of a potential of the RCT 3 involves:

increasing the voltage potential of the RCT 3 by means of the AB 7 above a first threshold level if the alarm signal is received by AB 7, and the determination 17 of the potential of the RCT 3 involves:

determining if the voltage potential of the RCT 3 is above the first threshold level, and the control 18 of the output voltage of the VC 6 involves:

disabling the output voltage at the output terminal 5 if the potential of the RCT 3 is determined to be above the first threshold level.

In one embodiment of the method, wherein when the RCT 3 is operatively connected to a potential VP 4 via a resistor R1, the control 16 of a potential of the RCT 3 involves:

decreasing the potential of the RCT 3 by means of AB 7 below a second threshold level if the previously received alarm signal is no longer received by AB 7, and the determining 17 of the potential of the RCT 3 involves:

determining if the potential of the RCT 3 is below the second threshold level, and the controlling 18 of the output voltage of the VC 6 involves:

enabling the output voltage at the output terminal 5 if the potential of the RCT 3 is determined to be below the second threshold level.

In one embodiment of the method, wherein when the RCT 3 is operatively connected to a VP 4 via a resistor R1, the control 16 of a potential of the RCT 3 involves:

decreasing the voltage potential of the RCT 3 by means of the AB 7 below a third threshold level if the alarm signal is received by the AB 7, and the determining 17 of the voltage potential of the RCT 3 involves:

determining if the voltage potential of the RCT 3 is below the third threshold level, and the control 18 of the output voltage of the VC 6 involves:

disabling the output voltage at the output terminal if the voltage potential of the RCT 3 is determined to be below the third threshold level.

In one embodiment of the method, wherein when the RCT 3 is operatively connected to a voltage potential, the control 16 of a voltage potential of the RCT 3 involves:

increasing the voltage potential of the RCT 3 by the AB 7 above a fourth threshold level if the previously received alarm signal is no longer received by the AB 7, and the determination 17 of the voltage potential of the RCT 3 involves:

determining if the voltage potential of the RCT 3 is above the fourth threshold level, and the control 18 of the output voltage of the VC 6 involves:

disabling the output voltage at the output terminal if the voltage potential of the RCT 3 is determined to be above the fourth threshold level.

In one embodiment of the method, wherein the detection 13 if an alarm condition occurs in the VC 6 involves:

detecting which at least one alarm condition that is active from a group of alarm conditions comprising operating parameters of the VC 6, and wherein the sending 14 of an alarm signal from the VC 6 involves:

sending at least one alarm signal indicating which alarm condition, from the group of alarm conditions, that is active, and wherein the control 17 of a voltage potential of a RCT 3 involves:

receiving the at least one alarm signal by means of an AB 7, and the AB 7 changing the voltage potential of the control terminal thereof in response to receipt of the at least one alarm signal, wherein the change of the voltage potential of the RCT 3 corresponds to the alarm condition that the at least one alarm signal indicated is operative, and wherein the VC 6 controls at least one operation thereof based on the voltage potential of the RCT 3.

In FIG. 6 a schematic block diagram of a power converter system (PCS) 19 is disclosed. The PCS 19 comprises at least one PCM 1 and a control branch (CB) 20. The CB 20 comprises a system control terminal 21, which is operatively connected to the RCT 3 of the at least one PCM 1. The CB 20 further comprises a voltage terminal 22 operatively connected to a voltage source 23, and an activation terminal 24. The activation terminal 24 is operative for receiving an activation signal that maneuvers the CB 20 to provide a connection between the voltage terminal 22 and the system control terminal 21, causing the PCS 19 to turn on or off, respectively. The PCS 19 disclosed in FIG. 6 is suitable for use in connection with positive logic.

In FIG. 7 a schematic block diagram of a power converter system (PCS) 19' is disclosed. In addition to the PCS 19 described hereinabove with reference to FIG. 6 the PCS 19' comprises a resistor R5 connected in series with the system control terminal 21 and the RCT 3 of the at least one PCM 1.

In the embodiments as disclosed in FIG. 6 and FIG. 7 the CB 20 can be a NPN-transistor and the voltage source 23 can preferably be ground potential of the PCS 19,19'. Such a PCS 19, 19' would exhibit some very convenient features such as if one of the at least one PCM 1 becomes non-operative due to an alarm condition of the corresponding VC 6, the corresponding AB 7 applies a potential, corresponding to disabling the output voltage of the VC 6, to the RCT 3 causing the other operative PCM 1 to disable the output voltages thereof, effectively turning off the PCS 19. When the previously malfunctioning PCM 1 becomes operative again the AB 7 thereof causes the potential of the RCT 3 to change to a potential causing the output voltage of the VC 6 to be enabled, and thereby turn on the PCS 19. Thus, the domino effect is completely eliminated by means of this synchronized start and stop of the at least two PCM 1.

In an exemplary scenario wherein a power converter system is configured according to FIG. 6 or FIG. 7 for current sharing (i.e. parallel configuration), the domino effect will be avoided due to the synchronized start and stop of the PCM 1. This will result in that less safety margin for the PCM 1 is needed compared to the common safety margins of 15-25%.

In another exemplary scenario wherein a power converter system is configured according to FIG. 6 with negative logic control of the PCM 1, in such a system full redundancy is achieved. This redundancy is achieved by the direct connection of the RCT 3 of the PCM 1 to the CB 20. In this system a single AB 7 of the PCM 1 cannot change the potential of the RCT 3 due to the direct connection to the voltage source 23, the voltage source may in this exemplary scenario be ground potential. Thus, full redundancy is achieved.

In another exemplary scenario wherein a power converter system is configured according to FIG. 7 with negative logic control of the PCM 1 and the resistor R5 is configured for partial redundancy. A configuration of the resistor R5 for partial redundancy is achieved by assuring that one single PCM 1 of the power converter system cannot change the potential of the RCT 3 to a level causing a shutdown of the complete system. This means that in a power converter system with three $PCM_{1-3}$ any one of $PCM_{1-3}$ may become non-operative without affecting the function of the other PCM, if one more PCM becomes non-operative and thus two PCM are non-operative the potential of the RCT 3 changes sufficiently much to cause the operative PCM to shut-down before an overload thereof occurs. Such a system would achieve partial redundancy using a single resistor R5 configured for this functionality. The level of redundancy can easily be adjusted by changing the value of the resistor R5.

In yet another exemplary scenario wherein a power converter system is configured according to FIG. 6 with positive logic control of the PCM 1 and the AB 7" configured according to FIG. 4. The power converter system comprises three $PCM_{1-3}$ configured for a current-sharing application. The voltage source 23 is in this scenario ground potential and the CB 20 is a NPN transistor with the emitter thereof connected to the ground potential via the voltage terminal 22, the source of the NPN transistor is connected to the system control terminal 21, and the base of the NPN transistor is used for external control of the power converter system. The power converter system becomes operative by turning off the NPN transistor of the CB 20 resulting in a common start of $PCM_{1-3}$. In this scenario the $PCM_1$ malfunctions and trigger an alarm condition in the VC 6 thereof. The AB 7" of the malfunctioning $PCM_1$ grounds the control terminal 10 to the low voltage potential 13 by means of the NPN transistor T2, hence the potential of the RCT 3 changes and the $PCM_{2-3}$ becomes non-operative. If the $PCM_1$ no longer is malfunctioning and the alarm condition changes, the NPN transistor T2 of the AB 7" disconnects the control terminal 10 from the low voltage potential 13 and the potential of the RCT 3 changes causes a common start of the $PCM_{1-3}$.

This scenario clearly demonstrates how this power converter system completely avoids the problems with the domino effect.

In this exemplary scenario is the compatibility issue of a PCM 1 according to embodiments herein discussed. Assume a power converter system comprising several power converter modules of earlier type controlled by either positive or negative logic. These earlier types of power converter modules also comprises a remote control pin for remote control thereof according to the hereinabove defined positive or negative logic control. The control by means of positive logic means that a high level on the remote control pin will enable the output from the power converter module, and a low level on the remote control terminal will disable the output voltage thereof. Hereinabove discussed embodiments may comply with this convention, thus full compatibility can be achieved without any extra precautions.

In hereinabove disclosed embodiments comprising at least one resistor, can of course the at least one resistor be replaced with a circuit that exhibits a voltage drop proportional to the current flowing through the circuit i.e. a resistive behaviour.

The above mentioned and described embodiments are only given as examples and should not be limiting. Other solutions, uses, objectives, and functions within the scope of the accompanying patent claims may be possible.

The invention claimed is:

1. A power converter module comprising:
   a voltage source,
   a remote control terminal configured to be connected to a voltage potential for remote control of the power converter module,
   an output terminal for output of an output voltage,
   a voltage converter operatively connected to said output terminal and to said remote control terminal, wherein the voltage converter is configured to:
     send an alarm signal,
     determine the voltage potential of the remote control terminal, and
     control the output voltage of the voltage converter at the output terminal of the power converter module based on the determined voltage potential of the remote control terminal, and
   an alarm branch comprising a bias terminal operatively connected to said voltage source, an alarm terminal operatively connected to said voltage converter for receiving said alarm signal, and a control terminal operatively connected to said remote control terminal, and wherein said alarm branch is configured to change the voltage potential of the remote control terminal by coupling the remote control terminal to the voltage source or to ground in response to an alarm signal from the voltage converter when said remote control terminal is connected to a voltage potential, thereby causing the voltage converter to control the output voltage at the output terminal.

2. The power converter module according to claim 1, wherein the alarm branch is configured to cause the voltage potential of the control terminal to be above a first threshold level in response to receipt of said alarm signal when the remote control terminal is connected to a voltage potential via a resistor, whereby the increased voltage potential of the remote control terminal above the first threshold level causes the voltage converter to disable the output voltage at the output terminal.

3. The power converter module according to claim 1, wherein the alarm branch is configured to cause the voltage potential of the control terminal to be below a second threshold level if a previously received alarm signal is no longer received by the alarm branch when the remote control terminal is connected to a voltage potential via a resistor, whereby the decreased voltage potential of the remote control terminal below the second threshold level causes the voltage converter to enable the output voltage at the output terminal.

4. The power converter module according to claim 1, wherein the alarm branch comprises:
   a first resistor operatively connected in a first end to said bias terminal and in a second end to said control terminal,
   a second resistor operatively connected in a first end to said control terminal,
   a PNP transistor, wherein an emitter thereof is operatively connected to said bias terminal, a base thereof is operatively connected to said alarm terminal, and an collector thereof is operatively connected to a second end of said second resistor.

5. The power converter module according to claim 1, wherein the alarm branch is configured to cause the voltage potential of the control terminal to be below a third threshold level in response to receipt of said alarm signal when the remote control terminal is connected to a voltage potential, whereby the decreased voltage potential of the remote control terminal below the third threshold level causes the voltage converter to disable the output voltage at the output terminal.

6. The power converter moduel according to claim 1, wherein the alarm branch is configured to cause the voltage potential of the control terminal to be above a fourth threshold level if the previously received alarm signal is no longer received by the alarm branch when the remote control terminal is connected to a voltage potential, whereby the increased voltage potential of the remote control terminal above the fourth threshold level causes the voltage converter to enable the output voltage at the output terminal.

7. The power converter module according to claim 1, wherein the alarm branch comprises:
   a first resistor operatively connected in a first end to said bias terminal and in a second end operatively connected to said control terminal,
   a NPN transistor, wherein an emitter thereof is operatively connected to a ground potential of the alarm branch, a base thereof is operatively connected to said alarm terminal, and a collector thereof is operatively connected to said control terminal.

8. Power converter module according to claim 1, wherein:
   the voltage converter is further configured to determine if an alarm condition occurs in the voltage converter, wherein said alarm condition is at least one from a group of alarm conditions comprising operating parameters of the voltage converter, and the voltage converter is further configured to send at least one alarm signal indicating which alarm condition, from said group of alarm conditions, that is operative,
   the alarm branch is configured to change the voltage potential of the control terminal thereof in response to receipt of said at least one alarm signal received from the voltage converter, and wherein said change of the voltage potential of the remote control terminal corresponds to the alarm condition that said at least one alarm signal indicated is operative,
   thereby allowing the voltage converter to control at least one operation thereof based on said voltage potential of the remote control terminal.

9. A method for operating a power converter module, the method comprising:
  detecting if an alarm condition has changed in a voltage converter of the power converter module,
  sending an alarm signal from said voltage converter to an alarm branch of the power converter module, if an alarm condition is detected by said voltage converter,
  controlling a voltage potential of a remote control terminal of the power converter module by means of said alarm branch if an alarm condition is detected by said voltage converter, wherein the alarm branch is controlled by said alarm signal and is arranged between a voltage source of the power converter module and said remote control terminal, wherein the remote control terminal is operatively connected to said voltage converter and connected to a voltage potential for remote control of the power converter module, and wherein said alarm branch is configured to change the voltage potential of the remote control terminal by coupling the remote control terminal to the voltage source or to ground in response to said alarm signal from the voltage converter,
  the voltage converter determining the voltage potential of the remote control terminal, and
  the voltage converter controlling the output voltage at an output terminal of the power converter module based on the determined voltage potential of the remote control terminal.

10. The method for operating a power converter module according to claim 9, wherein when the remote control terminal is operatively connected to a voltage potential via a resistor, the step of controlling a voltage potential of the remote control terminal involves:
  increasing the voltage potential of the remote control terminal by means of said alarm branch above a first threshold level if the alarm signal is received by said alarm branch,
  and said step of determining the voltage potential of the remote control terminal involves:
    determining if the voltage potential of the remote control terminal is above said first threshold level,
  and said step of controlling the output voltage of the voltage converter involves:
    disabling the output voltage at the output terminal if the voltage potential of the remote control terminal is determined to be above said first threshold level.

11. The method for operating a power converter module according to claim 9, wherein when the remote control terminal is operatively connected to a voltage potential via a resistor, the step of controlling a voltage potential of the remote control terminal involves:
  decreasing the voltage potential of the remote control terminal by means of said alarm branch below a second threshold level if a previously received alarm signal is no longer received by said alarm branch,
  and said step of determining the voltage potential of the remote control terminal involves:
    determining if the voltage potential of the remote control terminal is below said second threshold level,
  and said step of controlling the output voltage of the voltage converter involves:
    enabling the output voltage at the output terminal if the voltage potential of the remote control terminal is determined to be below said second threshold level.

12. The method for operating a power converter module according to claim 9, wherein when the remote control terminal is operatively connected to a voltage potential via a resistor, the step of controlling a voltage potential of the remote control terminal involves:
  decreasing the voltage potential of the remote control terminal by means of said alarm branch below a third threshold level if the alarm signal is received by said alarm branch,
  and said step of determining the voltage potential of the remote control terminal involves:
    determining if the voltage potential of the remote control terminal is below said third threshold level,
  and said step of controlling the output voltage of the voltage converter involves:
    disabling the output voltage at the output terminal if the voltage potential of the remote control terminal is determined to be below said third threshold level.

13. The method for operating a power converter module according to claim 9, wherein when the remote control terminal is operatively connected to a voltage potential, the step of controlling a voltage potential of the remote control terminal involves:
  increasing the voltage potential of the remote control terminal by said alarm branch above a fourth threshold level if the previously received alarm signal is no longer received by said alarm branch,
  and said step of determining the voltage potential of the remote control terminal involves:
    determining if the voltage potential of the remote control terminal is above said fourth threshold level,
  and said step of controlling the output voltage of the voltage converter involves:
    disabling the output voltage at the output terminal if the voltage potential of the remote control terminal is determined to be above said fourth threshold level.

14. Method for operating a power converter module according to claim 9, wherein the step of detecting if an alarm condition occurs in the voltage converter involves:
  detecting which at least one alarm condition that is active from a group of alarm conditions comprising operating parameters of the voltage converter,
  and wherein the step of sending an alarm signal from said voltage converter involves:
    sending at least one alarm signal indicating which alarm condition, from said group of alarm conditions, that is active,
  and wherein said step of controlling a voltage potential of a remote control terminal involves:
    receiving the at least one alarm signal by means of an alarm branch, and the alarm branch changing the voltage potential of the control terminal thereof in response to receipt of said at least one alarm signal, wherein said change of the voltage potential of the remote control terminal corresponds to the alarm condition that said at least one alarm signal indicated is operative,
  and wherein the voltage converter controls at least one operation thereof based on said voltage potential of the remote control terminal.

15. A power converter system comprising:
  at least one power converter module according to claim 1, and
  a control branch comprising:
    a system control terminal for remote control of the power converter system, which system control terminal is operatively connected to the remote control terminal of said at least one power converter module,
    a voltage terminal operatively connected to a voltage source, an activation terminal operative for receiving an activation signal,
wherein said control branch is configured to be controlled to be opened or closed by said activation signal when received by the activation terminal, wherein opening or closing of said control branch results in a changed voltage potential of the system control terminal by coupling the system control terminal to the voltage source or to ground and thereby the voltage potential of the remote control terminal of the at least one power converter module.

16. The power converter system according to claim 15, wherein a resistor is operatively connected in a first end to said remote control terminal of the at least one power converter module, and in a second end is operatively connected to said system control terminal of the alarm branch, whereby the alarm branch when closed, by means of the activation signal, causes a voltage drop over said resistor, thereby changing the voltage potential of the remote control terminal of the at least one power converter module.

* * * * *